United States Patent
Lincoln et al.

(10) Patent No.: US 11,726,035 B2
(45) Date of Patent: Aug. 15, 2023

(54) TERAHERTZ ENHANCED FOREIGN OBJECT DEBRIS DISCRIMINATION FOR OPTICAL PARTICULATE SENSOR

(71) Applicant: Raytheon Technologies Corporation, Farmington, CT (US)

(72) Inventors: David L. Lincoln, Cromwell, CT (US); Jose-Rodrigo Castillo-Garza, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 13 days.

(21) Appl. No.: 17/119,192

(22) Filed: Dec. 11, 2020

(65) Prior Publication Data

US 2022/0187202 A1    Jun. 16, 2022

(51) Int. Cl.
*G01N 21/94* (2006.01)
*G01N 21/3586* (2014.01)
*G01N 21/3577* (2014.01)

(52) U.S. Cl.
CPC ..... *G01N 21/3586* (2013.01); *G01N 21/3577* (2013.01); *G01N 21/94* (2013.01)

(58) Field of Classification Search
CPC . G01N 21/3586; G01N 21/3577; G01N 21/94
See application file for complete search history.

(56) References Cited

U.S. PATENT DOCUMENTS

| | | | |
|---|---|---|---|
| 5,675,249 A * | 10/1997 | LaClair | G01N 1/34 324/202 |
| 7,106,442 B2 * | 9/2006 | Silcott | G01N 15/1459 356/336 |
| 7,250,871 B2 * | 7/2007 | Williams | G01N 1/2247 340/630 |
| 7,782,459 B2 * | 8/2010 | Holve | G01N 15/0205 356/336 |
| 8,013,994 B1 * | 9/2011 | Vattiat | G01N 15/0227 219/121.36 |
| 8,210,033 B2 * | 7/2012 | Kondo | F01N 9/002 73/114.71 |
| 8,372,183 B2 | 2/2013 | Doucette et al. | |
| 8,459,103 B2 * | 6/2013 | Khibnik | F02C 7/052 73/112.01 |
| 9,222,873 B2 * | 12/2015 | Baumgardner | G01S 17/95 |
| 9,574,988 B2 * | 2/2017 | Donner | G01N 15/1459 |
| 9,725,155 B2 * | 8/2017 | Miller | B64D 27/12 |

(Continued)

*Primary Examiner* — David P Porta
*Assistant Examiner* — Djura Malevic
(74) *Attorney, Agent, or Firm* — Bachman & LaPointe, P.C.

(57) ABSTRACT

A method of foreign object debris discrimination incudes illuminating particulates located within a sensing volume with a first electromagnetic radiation pulse emitted from a first source, and illuminating the particulates within the sensing volume with a second electromagnetic radiation pulse emitted from a second source, wherein the second electromagnetic radiation pulse has a second wavelength range within the terahertz (THz) regime. The first electromagnetic radiation returns and the second electromagnetic radiation returns are compared to determine a scattering ratio from the comparing step. The scattering ratio is then utilized to determine a resultant foreign object debris type of the solid objects.

20 Claims, 7 Drawing Sheets

(56) References Cited

U.S. PATENT DOCUMENTS

| | | | |
|---|---|---|---|
| 9,909,971 B2* | 3/2018 | Knobloch | F02C 7/05 |
| 9,915,600 B2* | 3/2018 | Walls | G01N 15/0205 |
| 9,988,242 B1* | 6/2018 | Lincoln | G01N 21/47 |
| 10,006,875 B2 | 6/2018 | Larkins et al. | |
| 10,063,794 B2* | 8/2018 | Prata | G01S 19/53 |
| 10,124,410 B2* | 11/2018 | Kanko | B33Y 50/02 |
| 10,359,350 B1* | 7/2019 | Lin | G01N 15/1434 |
| 10,429,289 B2* | 10/2019 | Knox | G01N 21/53 |
| 10,458,990 B1* | 10/2019 | Manautou | G01N 21/6486 |
| 10,620,105 B2* | 4/2020 | Trainer | G01N 15/1459 |
| 10,690,584 B2* | 6/2020 | Burriel | G01N 1/26 |
| 10,826,547 B1* | 11/2020 | Gilson | H01P 3/12 |
| 10,845,294 B1* | 11/2020 | Lincoln | G01N 21/53 |
| 10,898,969 B2* | 1/2021 | Kanko | B23K 15/0013 |
| 10,943,449 B2* | 3/2021 | Birnkrant | G08B 17/06 |
| 10,998,958 B1* | 5/2021 | Gilson | H04B 7/15528 |
| 11,062,586 B2* | 7/2021 | Lincoln | G01N 21/51 |
| 11,149,583 B2* | 10/2021 | Dischinger | F01D 17/02 |
| 11,237,089 B2* | 2/2022 | Lin | G01N 21/53 |
| 2005/0243307 A1* | 11/2005 | Silcott | G01N 15/1459 356/73 |
| 2005/0259255 A1* | 11/2005 | Williams | G01N 1/2247 356/337 |
| 2009/0079981 A1* | 3/2009 | Holve | G01N 15/0205 356/336 |
| 2009/0112519 A1* | 4/2009 | Novis | F01D 21/14 702/183 |
| 2010/0242441 A1* | 9/2010 | Kondo | F01N 9/002 60/277 |
| 2010/0287907 A1* | 11/2010 | Agrawal | F02C 7/052 60/39.24 |
| 2010/0288034 A1* | 11/2010 | Agrawal | F01D 21/003 73/112.01 |
| 2010/0313639 A1* | 12/2010 | Khibnik | G01N 15/1031 73/112.01 |
| 2011/0179763 A1* | 7/2011 | Rajamani | F04D 29/701 60/39.092 |
| 2012/0324987 A1* | 12/2012 | Khibnik | G01N 15/0266 73/112.01 |
| 2013/0025348 A1* | 1/2013 | Rajamani | G01N 15/0266 73/28.01 |
| 2013/0080081 A1* | 3/2013 | Dugger | G16Z 99/00 73/861.25 |
| 2014/0104613 A1* | 4/2014 | Birnkrant | G01N 21/0303 356/402 |
| 2014/0330459 A1* | 11/2014 | Baumgardner | G01N 21/00 701/14 |
| 2015/0219571 A1* | 8/2015 | Demers | G01N 21/3581 250/341.1 |
| 2015/0369722 A1* | 12/2015 | Donner | G01N 15/1031 73/864.72 |
| 2016/0202164 A1* | 7/2016 | Trainer | G01N 15/0211 356/336 |
| 2017/0044416 A1* | 2/2017 | Sharon | C09K 5/14 |
| 2017/0070180 A1* | 3/2017 | Mills | H02S 40/32 |
| 2017/0120337 A1* | 5/2017 | Kanko | B23K 31/125 |
| 2017/0190409 A1* | 7/2017 | Miller | B64D 27/12 |
| 2017/0276588 A1* | 9/2017 | Knox | G08B 29/185 |
| 2018/0068498 A1* | 3/2018 | Hodge | F01D 21/003 |
| 2018/0224373 A1* | 8/2018 | Lincoln | G01N 21/31 |
| 2018/0252654 A1* | 9/2018 | Lincoln | G01N 21/94 |
| 2018/0297117 A1* | 10/2018 | Kanko | G01N 21/45 |
| 2018/0298778 A1* | 10/2018 | Dischinger | F01D 21/10 |
| 2019/0049578 A1* | 2/2019 | Koduru | G01S 13/953 |
| 2019/0094415 A1* | 3/2019 | Essawy | H04N 5/2256 |
| 2019/0145883 A1* | 5/2019 | Burriel | G01N 15/1404 250/435 |
| 2019/0226965 A1* | 7/2019 | Lin | G01N 15/1434 |
| 2019/0293555 A1* | 9/2019 | Birnkrant | G01N 21/49 |
| 2020/0193786 A1* | 6/2020 | Birnkrant | G08B 17/107 |
| 2020/0193790 A1* | 6/2020 | Lincoln | G08B 17/107 |
| 2020/0193795 A1* | 6/2020 | Lincoln | G01N 21/51 |
| 2020/0256777 A1* | 8/2020 | Lin | G01N 21/85 |
| 2020/0309663 A1* | 10/2020 | Trainer | G01N 15/0211 |
| 2021/0003075 A1* | 1/2021 | Lincoln | G01N 15/06 |
| 2021/0025977 A1* | 1/2021 | Mcvey et al. | B64G 1/10 |
| 2021/0138579 A1* | 5/2021 | Kanko | G01N 21/45 |
| 2021/0206003 A1* | 7/2021 | Zhou | G05D 1/0246 |
| 2021/0208068 A1* | 7/2021 | Lincoln | G01N 27/125 |
| 2021/0208078 A1* | 7/2021 | Birnkrant | G08B 17/107 |
| 2021/0241594 A1* | 8/2021 | Birnkrant | G08B 25/12 |
| 2021/0372922 A1* | 12/2021 | Guler | G08B 17/107 |

* cited by examiner

TERAHERTZ ENHANCED FOREIGN OBJECT DEBRIS DISCRIMINATION FOR OPTICAL PARTICULATE SENSOR

BACKGROUND

The present disclosure relates to foreign object debris discrimination.

Aircraft engines can be damaged by Foreign Object Debris (FOD). Large objects can cause significant changes detected by engine monitoring systems, such as shaft vibration measurement. Smaller objects however, such as sand grains, can cause damage that is barely visible but may still damage or weaken components.

Various optical particulate ingestion sensor systems are being integrated into gas turbine engines to identify FOD. Various multi-wavelength, multi-angle scattering light sources (e.g., LED) and sensors (e.g., photodiodes) provide scattering cross sections, however, this may not be suitable for FOD which can have complex geometries and may be composed of multiple materials. Further, due to the reflective and transient nature of particulate FOD such as moisture, fog, dust, ash, or smoke, the visibility conditions of the FOD may be effected.

SUMMARY

A method of foreign object debris discrimination according to one disclosed non-limiting embodiment of the present disclosure includes illuminating particulates located within a sensing volume with a first electromagnetic radiation pulse emitted from a first source; receiving one or more first electromagnetic radiation returns that have been scattered by the particulates illuminated by the first electromagnetic radiation pulse at one or more sensors; illuminating the particulates within the sensing volume with a second electromagnetic radiation pulse emitted from a second source, wherein the second electromagnetic radiation pulse has a second wavelength range within a terahertz (THz) regime; receiving one or more second electromagnetic radiation returns that have been scattered by the particulates illuminated by the second electromagnetic radiation pulse at one or more sensors; comparing, using a controller, the first electromagnetic radiation returns and the second electromagnetic radiation returns, wherein the first electromagnetic radiation returns and the second electromagnetic radiation returns are determinative between categories of foreign object debris to discriminate the foreign object debris.

A further embodiment of any of the foregoing embodiments of the present disclosure includes that the first electromagnetic radiation pulse has a first wavelength range within an optical regime, the optical regime comprises electromagnetic radiation in the wavelength range between 100 nm-1 mm.

A further embodiment of any of the foregoing embodiments of the present disclosure includes that the first electromagnetic radiation pulse has a first wavelength range within the terahertz (THz) regime, wherein the terahertz (THz) regime comprises electromagnetic radiation in the wavelength range between 50 GHz (6 mm)-3 THz (0.1 mm).

A further embodiment of any of the foregoing embodiments of the present disclosure includes illuminating the particulates within the sensing volume with a third electromagnetic radiation pulse emitted from a third source, wherein the third electromagnetic radiation pulse has a third wavelength range within the terahertz (THz) regime; receiving one or more third electromagnetic radiation returns that have been scattered by the particulates illuminated by the third electromagnetic radiation pulse at one or more sensors; comparing, using the controller, the third electromagnetic radiation returns and the second electromagnetic radiation returns, wherein the second electromagnetic radiation returns and the third electromagnetic radiation returns are determinative between categories of foreign object debris.

A further embodiment of any of the foregoing embodiments of the present disclosure includes that the terahertz (THz) regime comprises electromagnetic radiation in the wavelength range between 50 GHz (6 mm)-3 THz (0.1 mm).

A further embodiment of any of the foregoing embodiments of the present disclosure includes determining, using the controller, a pulse shape from the comparing step; and applying the pulse shape to a look-up table to identify the foreign object debris.

A further embodiment of any of the foregoing embodiments of the present disclosure includes that the particulates comprise liquid water particulates, ice particulates, fog particulates, marine aerosol particulates, smoke particulates, dust particulates, biological particulates, ash particulates, or salt particulates.

A further embodiment of any of the foregoing embodiments of the present disclosure includes discriminating based on the scattering ratio between the foreign object debris and the particulates; and determining, a quantity, a size, and a type of the foreign object debris.

A further embodiment of any of the foregoing embodiments of the present disclosure includes that the scattering ratio comprises a ratio of peak amplitudes from the first electromagnetic radiation returns and peak amplitudes from the second electromagnetic radiation returns.

A further embodiment of any of the foregoing embodiments of the present disclosure includes that the detection of the first electromagnetic radiation returns further comprises detection of at least one of a back-scatter, a mid-scatter, and a forward-scatter.

A system for particulate discrimination according to one disclosed non-limiting embodiment of the present disclosure includes a controller; a particulate sensor comprising a first set of sensing elements, and a second set of sensing elements; a tangible, non-transitory memory configured to communicate with the controller, the tangible, non-transitory memory having instructions stored thereon that, in response to execution by the controller, perform operations including emitting a first electromagnetic radiation pulse within a first wavelength range from a first electromagnetic radiation source into a sensing volume; emitting a second electromagnetic radiation pulse within a second wavelength range from a second electromagnetic radiation source into the sensing volume, wherein the second wavelength range is within the terahertz (THz) regime; receiving a scattered light from each of the first and the second electromagnetic radiation sources at a plurality of sensing devices as a first and second electromagnetic radiation return; comparing, using the controller, the first electromagnetic radiation returns and the second electromagnetic radiation returns; determining, using the controller, a scattering ratio from the comparing step; and applying, using the controller, the scattering ratio to a look-up table to identify a foreign object debris.

A further embodiment of any of the foregoing embodiments of the present disclosure includes that the first electromagnetic radiation source comprises a light emitting diode which operates within an optical regime which comprises electromagnetic radiation in the wavelength range between 100 nm-1 mm.

A further embodiment of any of the foregoing embodiments of the present disclosure includes that the first electromagnetic radiation source comprises a source which operates within the terahertz (THz) regime in the wavelength range between 50 GHz (6 mm)-3 THz (0.1 mm).

A further embodiment of any of the foregoing embodiments of the present disclosure includes illuminating the particulates within the sensing volume with a third electromagnetic radiation pulse emitted from a third source, wherein the third electromagnetic radiation pulse has a third wavelength range within the terahertz (THz) regime; receiving one or more third electromagnetic radiation returns that have been scattered by the particulates illuminated by the third electromagnetic radiation pulse at one or more sensors; receiving one or more third electromagnetic radiation returns that have been scattered by the particulates illuminated by the third electromagnetic radiation pulse at one or more sensors; comparing, using the controller, the third electromagnetic radiation returns and the second electromagnetic radiation returns, wherein the second electromagnetic radiation returns and the third electromagnetic radiation returns are determinative between categories of foreign object debris.

A further embodiment of any of the foregoing embodiments of the present disclosure includes a damage module in communication with the controller to calculate an accumulated engine damage using a physics-based model of a turbine engine.

A further embodiment of any of the foregoing embodiments of the present disclosure includes that the sensing volume is within at least one of an inlet ingestion sensing region, a turbine gas path sensing region, and a flow-path exhaust.

A system for particulate discrimination according to one disclosed non-limiting embodiment of the present disclosure includes a first electromagnetic radiation source operable to emit a first electromagnetic radiation pulse within a first wavelength range into a sensing volume; a first sensing element having a receiving cone defining a geometric volume that bounds the possible receipt paths of scattered electromagnetic radiations to sense reflections from the first electromagnetic radiation pulse from the sensing volume; a second electromagnetic radiation source operable to emit a second electromagnetic radiation pulse within a second wavelength range into the sensing volume, wherein the second wavelength range is within the terahertz (THz) regime in the wavelength range between 50 GHz (6 mm)-3 THz (0.1 mm); a second sensing element having a receiving cone defining a geometric volume that bounds the possible receipt paths of scattered electromagnetic radiations to sense reflections from the second electromagnetic radiation pulse from the sensing volume.

A further embodiment of any of the foregoing embodiments of the present disclosure includes that the first electromagnetic radiation source comprises a source which operates within the terahertz (THz) regime in the wavelength range between 50 GHz (6 mm)-3 THz (0.1 mm).

A further embodiment of any of the foregoing embodiments of the present disclosure includes that the second electromagnetic radiation source is located at a mid-scatter position.

A further embodiment of any of the foregoing embodiments of the present disclosure includes that, wherein the second sensing element is located at least one of a side-scatter position, and a forward-scatter position.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
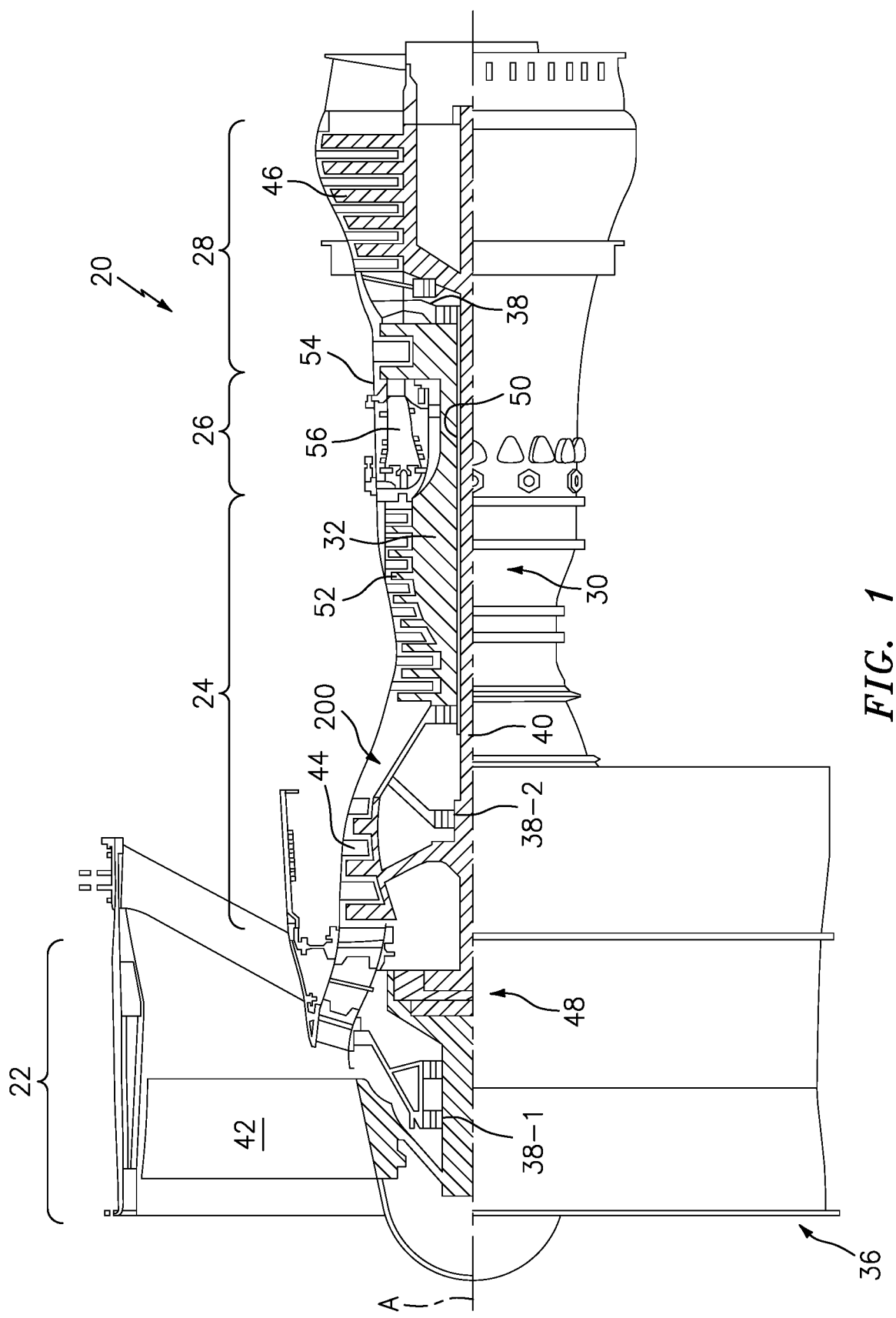
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures.

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 rotationally drive the respective high spool 32 and low spool 30 in response to the expansion.

Figure 2:
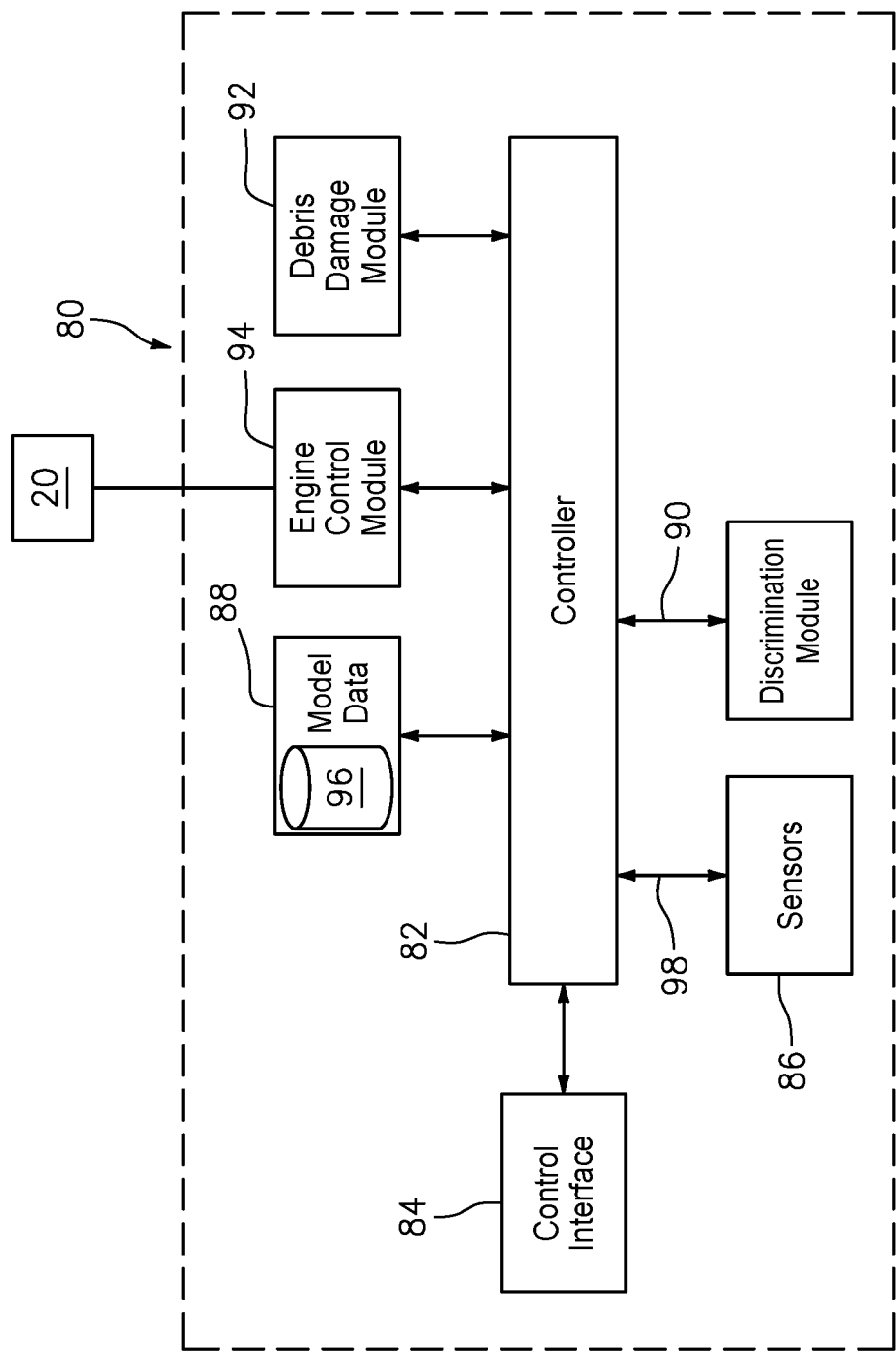
FIG. 2 is a perspective view of a system for particulate discrimination.

With reference to FIG. 2, a system 80 for particulate discrimination includes a controller 82, a control interface 84, sensors 86, a database 88, a discrimination module 90, a debris damage module 92, and an engine control module 94. The controller 82 may be configured as a central network element or hub with access various systems and may be implemented in a single processor, one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, or any combination thereof. The controller 82 may include a processor configured to implement various logical operations in response to execution of instructions. For example, instructions may be stored on a non-transitory, tangible, computer readable medium configured to communicate with other components. In response to execution by the controller, the system 80 performs various operations.

The controller 82 may also be in electronic communication with a user through the control interface 84, for example, a multifunction display. The control interface 84 enables a user to interact with the system 80, to issue commands and display information such as warnings.

The controller 82 may also be in electronic communication with the sensors 86 such as a particulate sensor, a temperature sensor, a torque sensor, a speed sensor, a pressure sensor, a position sensor, an accelerometer, a mass flow sensor, or other.

The controller 82 may also be in electronic communication with the database 88 to store and maintain data such as sensor data, configuration settings, response models such as the model data 96, and/or the like. Data may be stored or recalled from the database 88 in response to commands from the controller 82.

The controller 82 may also be in electronic communication with the discrimination module 90. The discrimination module 90 may receive sensor data 98 to discriminate between categories of foreign object debris including hard FOD (e.g., fasteners, rocks, etc.) and particulate FOD (e.g., silicate sand, dust, volcanic ash, sea-salt, smoke, steam, water vapor, and/or the like). In one example, the hard particulate FOD may be anything larger than about 1 mm (0.04 inches). Particulate FOD can also be damaging, but is not labeled as "hard" FOD. Hard vs soft corresponds to size (hard>1 mm, particulate<1 mm average particle diameters). Both hard and particulate may be damaging or non-damaging, for example, a large piece of chalk (>>1 mm) is considered non-damaging hard FOD.

The discrimination module 90 discriminates between categories of foreign object debris based on the sensor data 98 and algorithms such as the model data 96 which may define the various categories of hard FOD and particulate FOD within a look-up table or other relationship. The discrimination module 90 may determine a quantity, a size, and a type of the particulate matter. In various embodiments, the sensor data 98 may also include GPS data and/or atmospheric data to provide a spacial component to the FOD events.

The controller 82 may also be in electronic communication with the debris damage module 92. The debris damage module 92 may receive outputs from the discrimination module 90 and/or the sensor data 98 and is configured to determine a particulate concentration within the engine 20. The debris damage module 92 may determine a quantity or time-based map of ingested particulates between an inlet and an exhaust of the bypass flow-path and/or the core flow-path. The debris damage module 92 may determine a hazard level for a given particulate type and/or concentration and may record debris data based on the hazard level, the particulate type, or the particulate concentration. In various embodiments, the damage module 92 may generate a debris alert or a damage alert via the control interface 84.

The damage module 92 may calculate accumulated engine damage using a physics-based model of the turbine engine 20. The damage model 92 may be stored in the database 88. The damage model 92 may include modeling of gas turbine engine 20 component erosion based on the particulate type of FOD. The damage module 92 may provide the accumulated damage as a percentage of engine life remaining or a time before engine failure and display these measures via the control interface 84. The damage module 92 may also generate an alert based on exceeding a threshold value.

The controller 82 may also be in electronic communication with the engine control module 94. The engine control module 94 may be configured to command the engine 20 to, for example, instruct the engine 20 to increase or decrease shaft speeds, fuel flow, vane geometry, alter bypass airflow, set valves, etc. In various embodiments, the controller 82 may control the turbine engine 20 in response to the damage module 92 and/or discrimination module 90 outputs. For example, the engine control module 94 may reduce fuel flow in response to exceeding an engine damage threshold as determined by the damage module 92.

Figure 3:
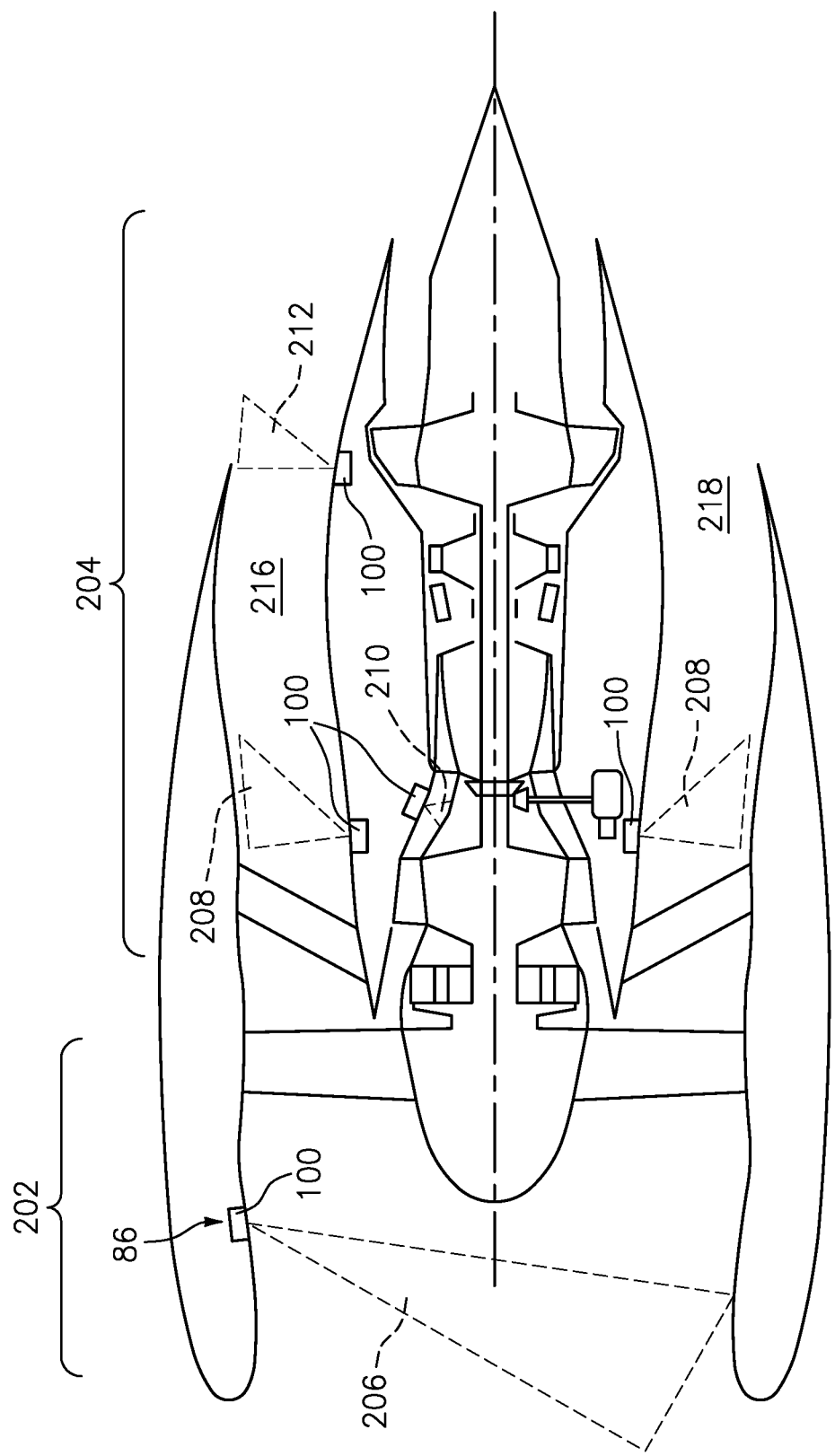
FIG. 3 is sectional view of a nacelle assembly for the gas turbine engine with the foreign object detection system.

With reference to FIG. 3, in various embodiments, the sensors 86 include a particulate sensor assembly 100 having sensing volumes such as an inlet ingestion sensing region 202 and a turbine gas path sensing region 204. A first sensing volume 206 may define the inlet ingestion sensing region 202. A second particulate sensor assembly may be arranged to observe a second sensing volume 208 within bypass flow-path proximate the inlet 214 of bypass duct 216. A third particulate sensor assembly may be coupled to the compressor section 24 to observe a third sensing volume 210 within core flowpath. A fourth particulate sensor assembly may be coupled proximate the exit 218 of bypass duct 216 to observe a fourth sensing volume 212 of the bypass flow-path exhaust and/or the core flow-path exhaust. It will be appreciated that any number of sensing volumes may be defined by a particulate sensor assembly configured for a particular area of interest.

Figure 4A:
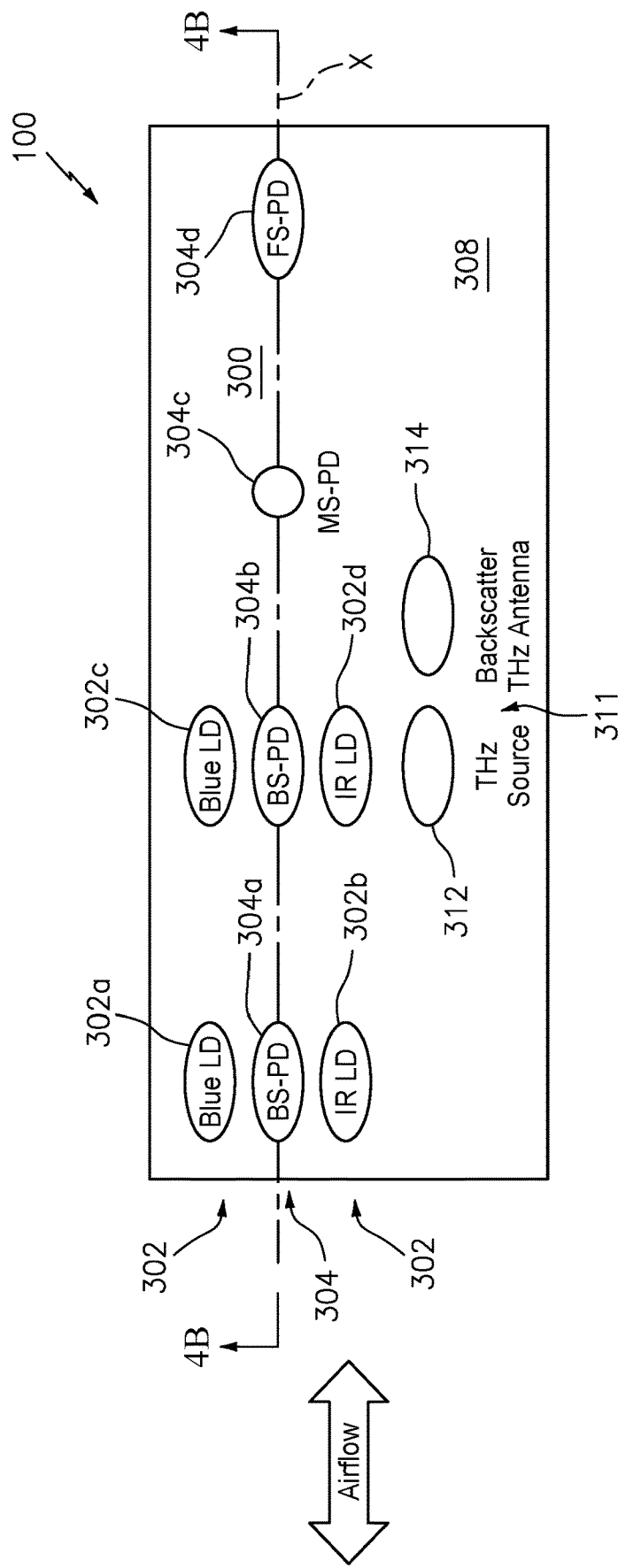
FIG. 4A is a schematic top view of a particulate sensor assembly.
Figure 4B:
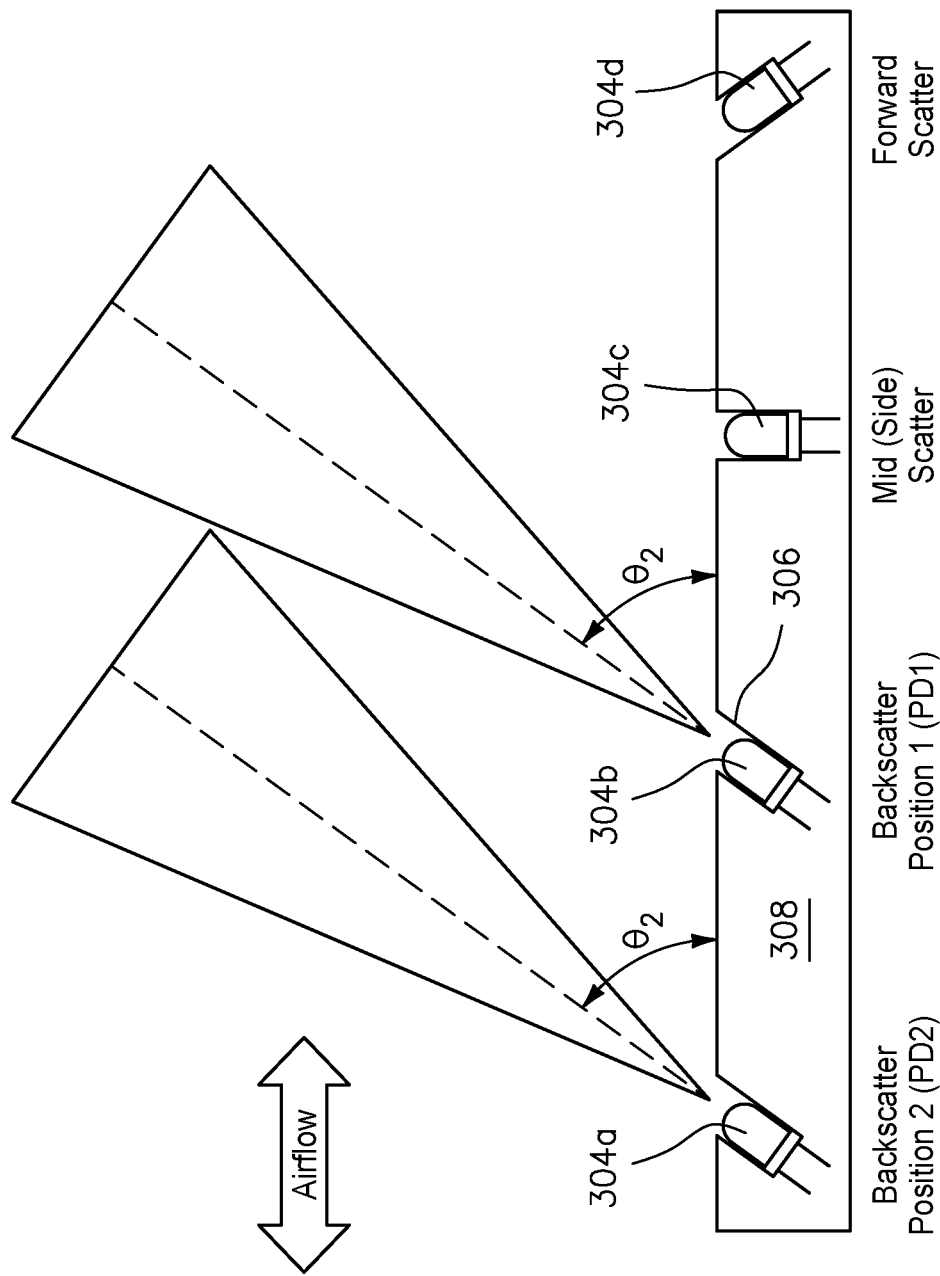
FIG. 4B is a schematic side view of a particulate sensor assembly of FIG. 4A.

With reference to FIG. 4A, one example particulate sensor assembly 100 includes an optical system 300 with a multiple of optical sources 302 and a multiple of optical sensors 304 configured to provide an optical response to the controller 82. Each of the multiple of optical sources 302, for example, a light-emitting diode (LED), emits electromagnetic radiation within an emitting cone within UV/VIS/IR regime. The sensors 304 may be, for example, photodiodes and light sensing devices such as Avalanche PhotoDiodes (APDs), Multi-Pixel Photon Counters (MPPCs), and other photodetectors. The multiple of optical sources 302 and the multiple of optical sensors 304 may be disposed within separate recesses 306 within a housing 308 (FIG. 4B). In some examples, however, some of the sensors and sources may be co-located within the same recess.

The term "optical" as utilized herein refers to electromagnetic radiation in the wavelength range between 100 nm and 1 mm. The terms "light" and "visible radiation" (VIS) refer to the wavelength range between 400 nm and 800 nm, which can be perceived by the human eye. Optical radiation with wavelengths shorter than 400 nm is called ultraviolet (UV) radiation and is further subdivided in UV-A, UV-B and UV-C ranges. Optical radiation with wavelengths longer than 800 nm is called infrared radiation (IR) and is similarly divided into IR-A (near-infrared, or NIR), IR-B (short-wavelength infrared, or SWIR), and IR-C (long-wavelength infrared, or LWIR). In this embodiment, the blue LED may emit light between 380 nm and 600 nm and the infrared LED may emit light at a wavelength between 600 nm and 2000 nm.

In one illustrated embodiment, the array includes blue LED 302a; back-scatter photodiode 304a; and infrared LED 302b arranged at a second back-scatter position. Blue LED 302c; back-scatter photodiode 304b; and infrared LED 302d are arranged at a first back-scatter position (FIG. 4B). Mid (side) scatter position photodiode 304c and forward-scatter position photodiode 304d are also included in the array along a common axis X parallel the engine central longitudinal axis A and may be generally aligned with engine airflow flow-path.

Multiple sensing volumes which may be considered the overlap between light source emission and detector field-of-view of the respective source/detector combinations, provide the sensor with additional information about the type of the particles. Multiple detectors positioned to receive light scattered at different scattering angles, which may be considered angle between the light cone's central axis and the central axis of the detector's field of view, interrogate the size of the FOD as the light scattering cross section of the FOD is dependent on both the scattering angle and the size of the FOD and may provide information on the surface roughness of hard FOD. Furthermore, the FOD's light scattering cross section is also dependent on wavelength. Thus, the signals received from light sources of multiple wavelength provides additional information on the size of the particle, but also may provide information on the surface optical properties, such as reflectance and absorption for discriminating FOD types.

Particulate FOD is more representative of signals being detected by both overlapping and non-overlapping sensing volumes. Hard FOD may only be detected by the non-overlapping sensing volume at a distance from the detector where typically particulate FOD will not be detected as the scattered light is at such low intensity (scattered light from particulate FOD close to the sensor can be detected). As demonstrated for smoke detection applications, multiple angles can be used to discriminate particulate types in close proximity to the sensor (assumes particulate FOD is dispersed throughout the inlet), however if hard FOD is close enough to the sensor to pick up the side and forward scatter, that information can be used to provide additional discrimination (surface roughness of hard FOD, absorbance, reflectance)

A combination of backscatter, forward, and side scatter also provides both overlapping and non-overlapping sensing volumes which is important for distinguishing between particulate FOD in close proximity to the sensor and hard FOD which may be detected at distances further from the sensor (outside of the forward and side scatter sensing volumes). The light scattering cross section of the FOD is angular dependent, whereby forward scattered light is enhanced with respect to side and backscatter for larger particulates, and provides additional parameters by which to discriminate particulate FOD by size and type. The backscatter sensing volume may be defined by the overlap of the sensor's field-of-view and the light cone of the emitter. If the light source is angled towards the detector, the sensing volume can be truncated.

Such an arrangement may also be advantageous for GHz-THz wavelengths to improve discrimination of particulate FOD where not only angular dependent scattered can be probed, but the interaction of GHz-Thz waves also depends on the particle type, such as water versus dirt or dust which have different absorption spectra in the GHz-THz regime. Multiple source emission wavelengths allows the sensor to discriminate between particle types—assuming the correct emission wavelengths are utilized, say one at peak absorption and one peak transmission, both in the same angular configuration, sampling the relatively same sensing volume. When the array arrangement of both backscatter, side, and forward scatter are utilized with multiple visible-IR and GHz-THz wavelengths, superior FOD discrimination is enabled, especially if the GHz-THz emission wavelengths utilized are associated with absorption features in the absorption spectra of the FOD of interest. The infrared light source 302b, 302d and the blue light source 302a, 302c may define, respectively, angles θ1 and θ2 (FIG. 4B) between the common axis X with a vertex at a center defined by a position between any of the light sensors 304a, 304b, 304c, 304d on the common axis.

Multi-angle, multi-wavelength interrogation with multiple emitters and photodetectors in the visible to IR domain can provide more robust discrimination of types of particulate FOD. Sensing volumes with different visible-IR wavelengths may provide some level of discrimination of damaging from non-damaging, but it can be dramatically enhanced by the addition of sensing volumes with interrogation wavelengths in the GHz-THz wavebands and comparing the GHz-THz responses with the visible-IR responses.

An angle of coincidence may be defined as the angle between the symmetry axis of each optical sources 302 and a symmetry axis of an acceptance cone of each optical sensor 304. Where the light source is pointed directly at the light sensor, the angle of coincidence is 180°. The different angles provide for increased discrimination of the particulate that is passing through the sensing volume. In other embodiments, various other volumes, wavelengths, and angles may alternatively and/or additionally be utilized. Angles θ1 and θ2 may be between 0° and 90°, or may be between 5° and 65°, or may be between 10° and 60°, and/or may be congruent. Each of the angles may be tailored for a desired detection distance, for example, between about 1 cm to 700 cm wherein "about" in this context means±5%. In various embodiments, the optical sources 302 and the optical sensors 304 are arranged transverse to the common axis X in a ladder pattern.

Each of the multiple of optical sources 302 may emit the electromagnetic radiation as a pulse. The pulse may have a duration of 100 microseconds as pulses having a duration of 100 microseconds or less facilitates ambient light rejection. Capacitive coupling of the sensor to an operational amplifier may remove the DC component of ambient light for long light pulses on the order of hundreds of microseconds. Shorter pulses on the order of nanoseconds allows the cutoff frequency of the capacitive coupling time constant to be increased to remove time varying ambient light which varies at a frequency lower than the cutoff frequency. Alternatively, ambient light may be removed by subtracting a background measurement with the light source off from the foreground measurement with the light source on. To remove rapidly varying ambient light in this scheme, the time between the background and foreground measurements should be as short as possible, which is partly accomplish via shorter pulses.

With two or more sources emitting electromagnetic radiation as sequential, separate pulses from each source allows the same sensor to accurately determine the intensity of scattered electromagnetic radiation returns corresponding to pulses from each source. Each of the multiple of optical sensors 304 generally has a receiving cone defining a geometric volume that bounds the possible receipt paths of scattered electromagnetic radiations. The volume where the emitting cones and receiving cones overlap defines the respective sensing volume 206, 208, 212 as schematically illustrated in FIG. 3. In one embodiment, the optical system is configured to measure intensity from each channel at a frequency of 15 kHz. In other embodiments, the optical system is configured to measure intensity from each channel at a frequency between 15 kHz and 100 Mhz. Faster sample rate would allow for sizing of smaller particulates at velocity.

The optical system 300 may utilize filters that selectively transmit a range of wavelengths of electromagnetic radiation, e.g., infrared, blue, red, etc. The optical filters may be configured to, for example, selectively transmit a range of wavelengths of electromagnetic radiation emitted by one source and exclude a range of wavelengths of electromagnetic radiation emitted by another source. The optical filters may also be configured to exclude ambient light. This allows the system to illuminate particulates with electromagnetic radiation from each wavelength range simultaneously, rather than sequentially, while accurately determining the intensity of electromagnetic radiation returns in each wavelength range. For example, optical bandpass filters can be installed over the respective photodetector such that measurements of sensing regions with multiple wavelengths can be interrogated simultaneously without optical crosstalk. Rather than using optical filters, the optical system may also have sources configured to emit, for example, a range of wavelengths of electromagnetic radiation within a single or several wavelength ranges.

The optical system may be configured to screen out particulate FOD such as water vapor, ice crystals, fog, smoke, dust, or ash in response to the chosen GHz-THz waveband that is transmissive with respect to the particulate FOD to be screened out. The particulate FOD may also be a marine aerosol, or salt particulates, such as water or oil droplets surrounding NaCl particulates which may be considered damaging FOD.

In this embodiment, the optical system 300 further includes a terahertz (THz) system 311 with a multiple of terahertz (THz) sources 312 and a multiple of terahertz (THz) sensors 314 to provide a terahertz response. In the illustrated embodiment, the optical system 300 includes a back-scatter terahertz (THz) source 312a at the first position and a back-scatter terahertz (THz) antenna 314a between the first position and the mid (side) scatter photodiode 302d.

Figure 5A:
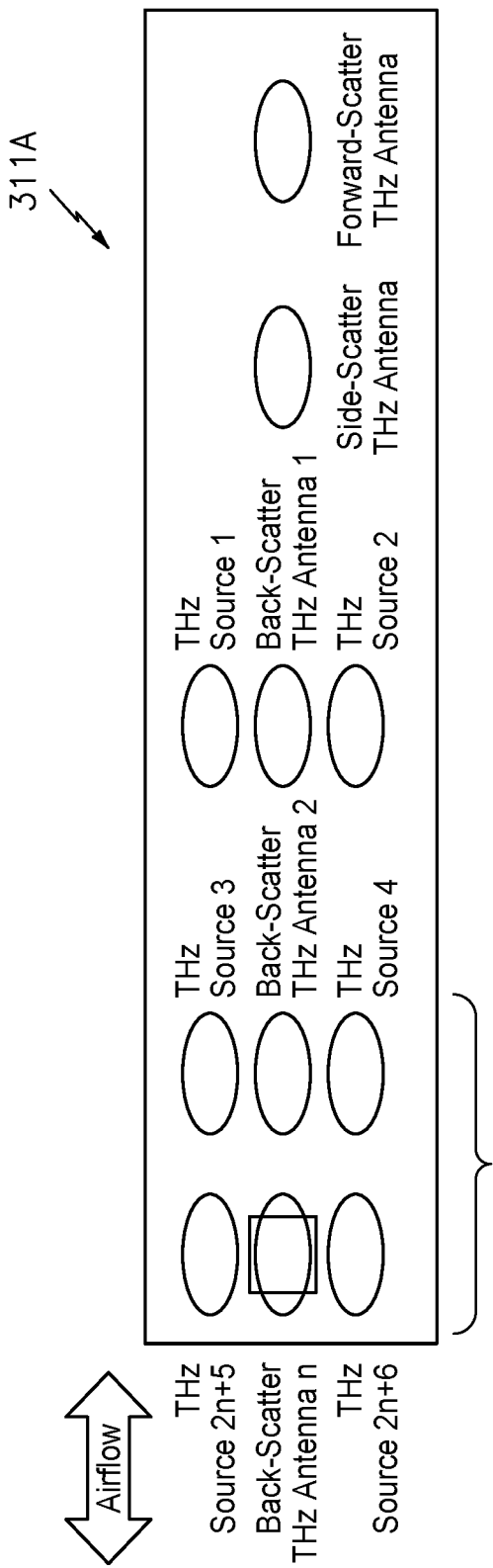
FIG. 5A is a schematic top view of a particulate sensor assembly according to another embodiment.
Figure 5B:
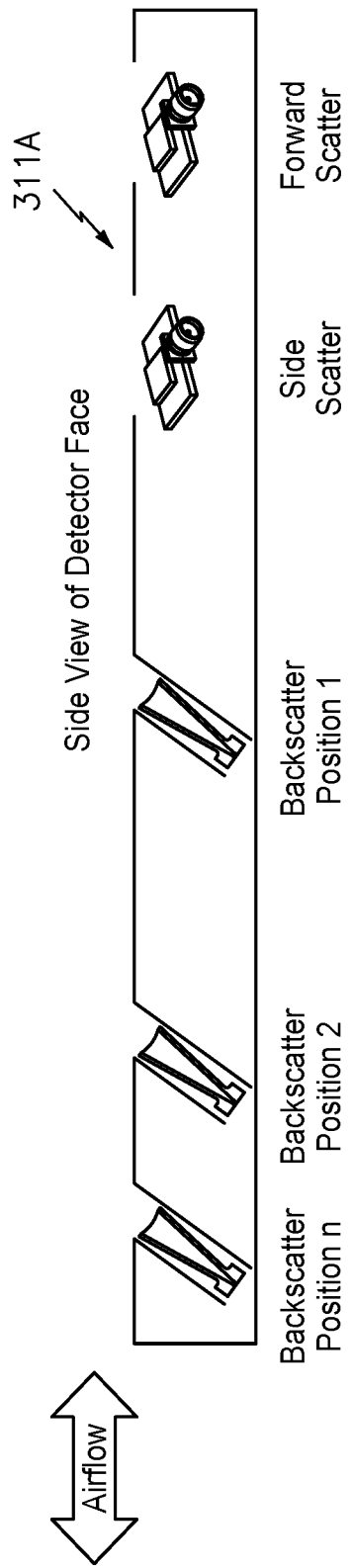
FIG. 5B is a schematic side view of the particulate sensor assembly of FIG. 5A.

In an alternate embodiment, the terahertz (THz) system 311a may include one or more terahertz (THz) sources 312 and one or more multiple of terahertz (THz) sensors 314 (FIGS. 5A and 5B). The terahertz (THz) system 311 may additionally or alternatively, be located in a forward-scatter position and/or mid-scatter position.

The terahertz (THz) regime (e.g., GHz-THz: 50 GHz (6 mm)-3 THz (0.1 mm); THz is typically defined as 0.3-3 THz (1 mm-0.1 mm)) facilitates discrimination of hard FOD. Materials such as plastic, gasoline, paper, etc. are essentially transparent in the terahertz (THz) regime while metal and carbon fiber, which are typical examples of hard FOD, are reflected, providing a parameter by which to discriminate between damaging and non-damaging FOD. The terahertz (THz) regime spectroscopy is also able to obtain spectra for water vapor, polar plastics, etc., to thereby permit enhanced discrimination and identification thereof. Operation in the terahertz (THz) regime provides a response to materials in comparison to the UV/VIS/IR optical regime spectroscopy to provide additional parameters for discrimination between damaging and non-damaging FOD. Each source can be configured to emit within a specific GHz-THz waveband, or scan across wavebands. Scanning across wavebands enables discrimination via terahertz (THz) spectroscopy or multiple wavebands from different sources also enables terahertz (THz) spectroscopy measurements if wavebands are selected for materials of interest to identify. In addition to providing discrimination and identification of FOD, interrogation with GHz-THz wavebands enables the sensor to detect hard FOD in the presence of high concentrations of particulates, such as dust and fog that are transparent in specific GHz-THz wavebands. This feature is also useful for providing robustness to contamination on the surface of the sensor, where the GHz-THz radiation, unlike visible-IR radiation, can penetrate through such contaminants such as oil, dirt, and water without significant losses or scattering which would otherwise adversely affect the detection and discrimination of FOD.

Figure 6:
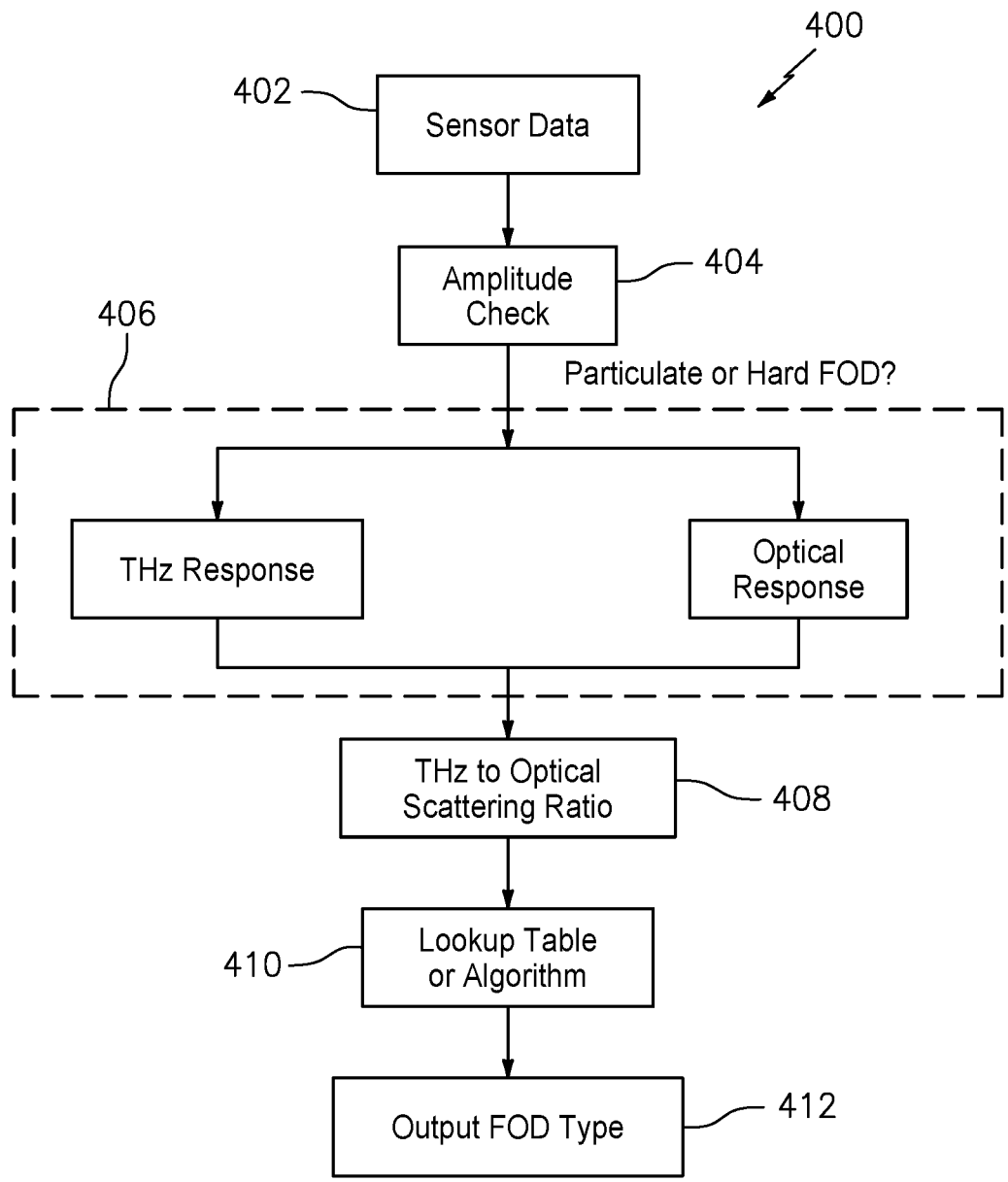
FIG. 6 is a block diagram illustrating operation of the foreign object detection system according to one non-limiting embodiment.

With reference to FIG. 6, a method 400 of foreign object debris discrimination with the detection system 80 is disclosed in terms of functional block diagrams. The functions of the logic are programmed software routines capable of execution in various microprocessor based electronics control embodiments and represented herein as the block diagrams. These functions may be enacted in either dedicated hardware circuitry or programmed software routines capable of execution in a microprocessor-based electronics control embodiment.

Initially, sensor data is provided by the optical system 300 (step 402). Next, an amplitude check is performed (step 404) to determine if particulate FOD or hard FOD is detected by the optical system 300. For example, the amplitude check would identify if a pulse shape from separate sensors is sufficiently narrow and of low amplitude to be considered particulate FOD, while a larger pulse width and amplitude will be indicative of hard FOD. Furthermore, if a low amplitude pulse of sufficiently large pulse width is detected on the backscatter sensor, but not in the forward or side scatter sensors, then the particulate can be considered hard FOD that has been detected at a distance beyond the forward and side scatter sensing volumes.

Next, the optical response and the terahertz response are compared (step 406). The optical response and the terahertz response as represented in step 406 may each comprise multiple terahertz responses may be first compared to each other and multiple optical responses may be compared to each other.

The comparison of the optical response and the terahertz response provides a scattering ratio (step 408). Alternatively or in addition, multiple terahertz (THz) scattering ratios could be used in combination to improve discrimination by particle type. For example, a ratio of the peak amplitudes may be utilized. For a comparison of optical to Thz, data-driven algorithms may be utilized to provide discrimination.

The ratio is then applied to a look-up table (step 410) to provide a resultant FOD type (step 412) as classified by the look-up table. Alternatively, an algorithm may be used to determine FOD type. The foreign object debris size and type can be based on characterizing the one or more particulates of foreign object debris. For example, through testing and calibration, the sensor data may have different signatures that can be used to distinguish between particulates, smoke, dust, water, and metallic particulates. Since signal strength may vary depending upon the distance of particulate FOD from the optical sensors, the controller can compute ratio values to scale results. Scattering volume ratios can provide information on the type of particulate based on the scattering properties, such as polarization and index of refraction.

Recognition of the resultant FOD type facilitates determination of maintenance requirements such that scheduling thereof may be reduced. The ability of wavelength range within a terahertz (THz) regime to have a different optical response to materials in comparison to the optical (UV/VIS/IR) regime provides additional parameters for discrimination of damaging and non-damaging FOD. Also, spectral information is capable of providing identification of specific material, e.g. water vapor, in addition to providing sensor robustness to contamination (such as water and oil) on the surface of the detector and ability to detect hard FOD in the presence of high concentration of specific particulate FOD (such as fog and dust).

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of foreign object debris discrimination within a gas turbine engine, comprising:
    illuminating categories of particulates having a size greater than 1 mm and a size less than 1 mm located within a sensing volume with a first electromagnetic radiation pulse emitted from a first source, said sensing volume is within at least one of an inlet ingestion sensing region, a turbine gas path sensing region, and a flow-path exhaust of the gas turbine engine;
    receiving one or more first electromagnetic radiation returns that have been scattered by the categories of particulates illuminated by the first electromagnetic radiation pulse at one or more sensors;
    illuminating the categories of particulates within the sensing volume with a second electromagnetic radiation pulse emitted from a second source, wherein the second electromagnetic radiation pulse has a second wavelength range within a terahertz (THz) regime;
    receiving one or more second electromagnetic radiation returns that have been scattered by the categories of particulates illuminated by the second electromagnetic radiation pulse at one or more sensors;
    creating multiple offset backscatter sensing volumes;
    comparing, using a controller, the first electromagnetic radiation returns and the second electromagnetic radiation returns, wherein the first electromagnetic radiation returns and the second electromagnetic radiation returns are determinative between the categories of particulates and of foreign object debris to discriminate the foreign object debris; and
    controlling, using the controller and an engine control module and a discrimination module, the gas turbine engine responsive to outputs from the damage control module and discrimination module.

2. The method as recited in claim 1, wherein the first electromagnetic radiation pulse has a first wavelength range within an optical regime, the optical regime comprises electromagnetic radiation in the wavelength range between 100 nm-1 mm.

3. The method as recited in claim 1, wherein the first electromagnetic radiation pulse has a first wavelength range within the terahertz (THz) regime, wherein the terahertz (THz) regime comprises electromagnetic radiation in the wavelength range between 50 GHz (6 mm)-3THz (0.1 mm).

4. The method as recited in claim 1, further comprising:
    illuminating the categories of particulates within the sensing volume with a third electromagnetic radiation pulse emitted from a third source, wherein the third electromagnetic radiation pulse has a third wavelength range within the terahertz (THz) regime;
    receiving one or more third electromagnetic radiation returns that have been scattered by the categories of particulates illuminated by the third electromagnetic radiation pulse at one or more sensors; and
    comparing, using the controller, the third electromagnetic radiation returns and the second electromagnetic radiation returns, wherein the second electromagnetic radiation returns and the third electromagnetic radiation returns are determinative between the categories particulates and of foreign object debris.

5. The method as recited in claim 4, wherein the terahertz (THz) regime comprises electromagnetic radiation in the wavelength range between 50 GHz (6 mm)-3THz (0.1 mm).

6. The method as recited in claim 1, further comprising:
    determining, using the controller, a pulse shape from the comparing step; and
    applying the pulse shape to a look-up table to identify the foreign object debris.

7. The method as recited in claim 1, wherein the particulates comprise liquid water particulates, ice particulates, fog particulates, marine aerosol particulates, smoke particulates, dust particulates, biological particulates, ash particulates, or salt particulates.

8. The method as recited in claim 7, further comprising:
    discriminating based on the scattering ratio between the foreign object debris and the particulates; and
    determining, a quantity, a size, and a type of the foreign object debris.

9. The method as recited in claim 1, wherein the scattering ratio comprises a ratio of peak amplitudes from the first electromagnetic radiation returns and peak amplitudes from the second electromagnetic radiation returns.

10. The method as recited in claim 1, wherein the detection of the first electromagnetic radiation returns further comprises detection of at least one of a back-scatter, a mid-scatter, and a forward-scatter.

11. A system for particulate discrimination within a gas turbine engine, comprising:
    a controller in electronic communication with at least one of a control interface, sensors, a database, a discrimination module, a debris damage module and an engine control module;
    said sensors including a particulate sensor comprising a first set of sensing elements, and a second set of sensing elements;

a tangible, non-transitory memory configured to communicate with the controller, the tangible, non-transitory memory having instructions stored thereon that, in response to execution by the controller, perform operations comprising:

emitting a first electromagnetic radiation pulse within a first wavelength range from a first electromagnetic radiation source into a sensing volume, said sensing volume is within at least one of an inlet ingestion sensing region, a turbine gas path sensing region, and a flow-path exhaust of the gas turbine engine;

emitting a second electromagnetic radiation pulse within a second wavelength range from a second electromagnetic radiation source into the sensing volume, wherein the second wavelength range is within the terahertz (THz) regime;

creating multiple offset backscatter sensing volumes;

receiving a scattered light from each of the first and the second electromagnetic radiation sources at a plurality of sensing devices as a first and second electromagnetic radiation return;

comparing, using the controller, the first electromagnetic radiation returns and the second electromagnetic radiation returns;

determining, using the controller, a scattering ratio from the comparing step;

applying, using the controller, the scattering ratio to a look-up table to identify a foreign object debris;

determining, using the controller and the discrimination module a quantity, a size, and a type of particulate matter;

determining, using the controller and the debris damage module, a particulate concentration within the gas turbine engine; and controlling, using the controller and engine control module and discrimination module, the gas turbine engine responsive to outputs from the damage control module and discrimination module.

12. The system as recited in claim 11, wherein the first electromagnetic radiation source comprises a light emitting diode which operates within an optical regime which comprises electromagnetic radiation in the wavelength range between 100 nm-1 mm.

13. The system as recited in claim 11, wherein the first electromagnetic radiation source comprises a source which operates within the terahertz (THz) regime in the wavelength range between 50 GHz (6 mm)-3THz (0.1 mm).

14. The system as recited in claim 11, further comprising:
illuminating the particulates within the sensing volume with a third electromagnetic radiation pulse emitted from a third source, wherein the third electromagnetic radiation pulse has a third wavelength range within the terahertz (THz) regime;

receiving one or more third electromagnetic radiation returns that have been scattered by the particulates illuminated by the third electromagnetic radiation pulse at one or more sensors; and comparing, using the controller, the third electromagnetic radiation returns and the second electromagnetic radiation returns, wherein the second electromagnetic radiation returns and the third electromagnetic radiation returns are determinative between categories of foreign object debris.

15. The system as recited in claim 11, further comprising a damage module in communication with the controller to calculate an accumulated engine damage using a physics-based model of a turbine engine.

16. The system as recited in claim 11, wherein the inlet ingestion sensing region includes a first sensing volume, the turbine gas path sensing region includes a second sensing volume within a bypass flow-path, a third sensing volume within a core flowpath, and the flow-path exhaust includes a fourth sensing volume.

17. A system for particulate discrimination, comprising:
a first electromagnetic radiation source operable to emit a first electromagnetic radiation pulse within a first wavelength range into a sensing volume, said sensing volume is within at least one of an inlet ingestion sensing region, a turbine gas path sensing region, and a flow-path exhaust of the gas turbine engine;

a first sensing element having a receiving cone defining a geometric volume that bounds the possible receipt paths of scattered electromagnetic radiations to sense reflections from the first electromagnetic radiation pulse from the sensing volume;

a second electromagnetic radiation source operable to emit a second electromagnetic radiation pulse within a second wavelength range into the sensing volume, wherein the second wavelength range is within the terahertz (THz) regime in the wavelength range between 50 GHz (6 mm)-3THz (0.1 mm);

a second sensing element having a receiving cone defining a geometric volume that bounds the possible receipt paths of scattered electromagnetic radiations to sense reflections from the second electromagnetic radiation pulse from the sensing volume; and multiple offset backscatter sensing volumes in operative communication with the first sensing element and the second sensing element.

18. The system as recited in claim 11, wherein the first electromagnetic radiation source comprises a source which operates within the terahertz (THz) regime in the wavelength range between 50 GHz (6 mm)-3THz (0.1 mm).

19. The system as recited in claim 11, wherein the second electromagnetic radiation source is located at a mid-scatter position.

20. The system as recited in claim 11, wherein the second sensing element is located at least one of a side-scatter position, and a forward-scatter position.

* * * * *